United States Patent [19]

Cukelj

[11] Patent Number: 5,267,484
[45] Date of Patent: Dec. 7, 1993

[54] QUILL-FEED SPEED HANDLE

[75] Inventor: Mirko Cukelj, Chesterland, Ohio

[73] Assignee: High Quality Tools, Inc., Wickliffe, Ohio

[21] Appl. No.: 926,916

[22] Filed: Aug. 7, 1992

[51] Int. Cl.⁵ .......................... G05G 1/12; F16D 11/00
[52] U.S. Cl. ........................................ 74/543; 74/548
[58] Field of Search ................ 74/519, 523, 543, 545, 74/548, 528, 529, 524, 547; 403/92, 93

[56] References Cited

U.S. PATENT DOCUMENTS

| 1,237,242 | 8/1917 | Case | 74/548 |
| 1,509,943 | 9/1924 | Farmer | 74/548 |
| 1,999,457 | 4/1935 | Hoehn | 74/518 |
| 2,015,553 | 9/1935 | Exner | 74/548 |
| 2,447,574 | 8/1948 | Gibbons | 74/548 |
| 2,452,742 | 11/1948 | Franzene | 74/548 |
| 4,037,488 | 7/1977 | Laney, Sr. | 74/548 |
| 4,456,219 | 6/1984 | Scott et al. | 74/523 |
| 4,531,715 | 7/1985 | Wiens | 74/547 X |
| 4,570,901 | 2/1986 | Holtgraver | 74/543 X |

OTHER PUBLICATIONS

A page for a High Quality Tools catalog illustrating a Quill-Feed Speed Handle, HQT Part No. 1021.

Primary Examiner—Leslie A. Braun
Assistant Examiner—Ryan W. Massey
Attorney, Agent, or Firm—Watts, Hoffmann, Fisher & Heinke

[57] ABSTRACT

A handle assembly for producing rotational movement in a milling machine quill and a quill shaft member defining a plurality of bores. The handle assembly comprises a member engagement housing including two bores positioned in confronting relation with the quill shaft member bores when the housing is operatively connected to the quill shaft member such that the housing is capable of rotation relative to the quill shaft member. An actuating handle member is pivotally connected to the housing and movable between a structure engaging position and a structure releasing position. Two pins are slidably supported in the housing bores and each pin defines a notch near an inner end with the notch being sized to receive a peripheral portion of the actuating handle such that movement in the handle between the structure releasing and structure engaging positions produces concurrent movement in the pins. When the pins are aligned with two selected quill shaft member bores, the pins move into the selected bores when the actuating handle moves to the structure engaging position thereby preventing rotation of the housing relative to the quill shaft member. A spring is provided for biasing the pin toward the structure engaging position.

8 Claims, 4 Drawing Sheets

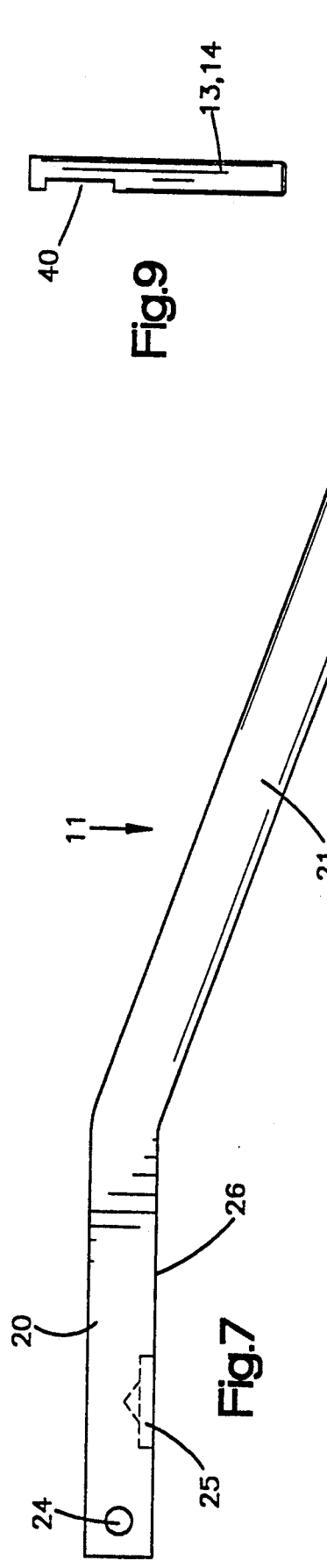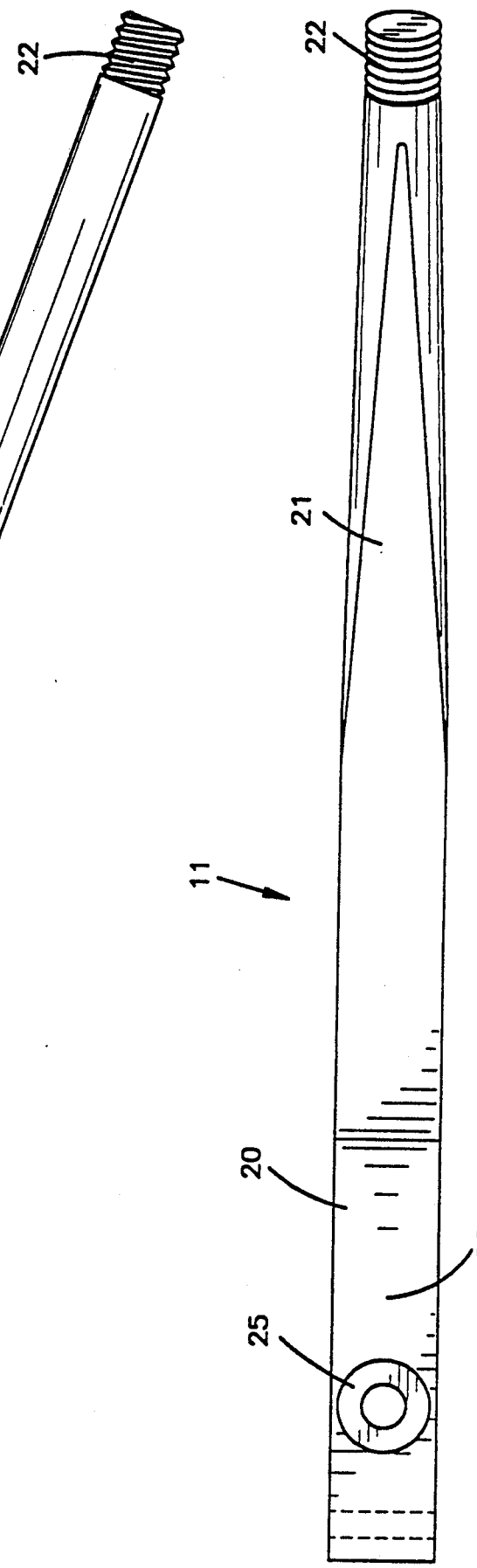

QUILL-FEED SPEED HANDLE

TECHNICAL FIELD

This invention relates to a handle assembly, and more specifically, a quill-feed speed handle for use on machines such as milling machines or drill presses.

BACKGROUND OF THE INVENTION

Typical milling machines have what is termed a quill in which an end mill, drill, etc. is held and rotatably driven by a drive motor. The quill is vertically movable towards and away from a workpiece. A quill handle is normally attached to a spindle or shaft that, when rotated, moves the quill towards and away from the workpiece.

A prior "speed handle" allows an operator to quickly reposition the handle with respect to the shaft. Due to the gearing between the shaft and the quill, several rotations of the handle may be needed to move the quill between its extreme positions. However, during actual use, the quill is normally moved vertically, only a short distance, i.e., to drill a shallow bore. In the prior handle assembly, a reciprocatably movable pin is operatively connected to a handle forming part of the assembly. The handle assembly is maintained to the quill shaft by a set screw that loosely engages a groove formed in the shaft. The engagement between the screw and the groove enables the handle assembly to rotate relative to the quill while remaining engaged to the quill shaft. The single pin under the control of the handle engages a selected one of a plurality of bores forming part of the quill, thereby locking the handle to the quill to prevent relative rotation when the handle member is in an engagement position. This type of handle enables an operator to reposition the handle so that it is in a desired position (where maximum mechanical leverage can be obtained by the operator) for the particular machining operation.

With this prior "speed handle", excessive operator force could shear the single pin. If the pin fails, the handle assembly becomes useless. Additionally, the prior "speed handle" can be complicated and expensive to manufacture. In order to mount the pin to the handle member, a rather complicated slot is formed centrally in the handle member and is adapted to receive the head of the pin. This slot requires precise and costly machining.

SUMMARY OF THE INVENTION

The present invention provides a handle assembly for producing rotational movement in a machine element having structure defining an engagement region, with the engagement region having at least one engagement recess. The handle assembly comprises a structure engaging housing including at least one bore positioned in confronting relation with the machine element structure when the housing is operatively connected to the machine element. The housing is coupled to the structure with the coupling maintaining the confronting relationship between the housing and the engagement region of the structure while permitting relative rotation therebetween. An actuating handle member is pivotally connected to the housing and movable between a structure engaging position and a structure releasing position. A pin is slidably supported in the housing bore and defines a notch near an inner end with the notch being sized to receive a peripheral portion of the actuating handle so that movement in the handle between the structure releasing and structure engaging positions produces concurrent movement in the pin. When the pin is aligned with the recess, the pin enters the recess when the actuating handle moves to the structure engaging position. Structure is provided for biasing the pin toward the structure engaging position.

In the preferred embodiment, the handle assembly includes two housing bores and two pins, with each pin being slidably supported in a corresponding one of the housing bores and defining a notch near an inner end. The notch is sized to receive a peripheral portion of the actuating handle. Additionally, in the preferred embodiment, the engagement region comprises a collar-like structure and includes a plurality of recesses in the form of spaced-apart axial bores defined within the collar-like structure and arranged in a circle. The pins engage two selected bores when the actuating handle moves into the engaging position.

Also, in the preferred embodiment, a cover is placed over the handle assembly and a spring is mounted between the cover and the actuating handle to bias the actuating handle, and thereby the pins toward the structure engaging position.

With the preferred embodiment, the shear strength of the handle assembly is improved as the two pins provide more strength than a single pin. Additionally, the two-pin design is easier to manufacture and is no more expensive than prior designs. The notches in the pins of the preferred embodiment are much easier to machine than the prior "blind" slot that must be aligned with the housing bore.

Additional features of the invention will become apparent and a fuller understanding obtained by reading the following detailed description made in connection with the accompanying drawings.

BRIEF DESCRIPTION OF THE DRAWINGS

FIG. 7 is an elevational view of an actuating handle forming part of the handle assembly embodying the present invention;

FIG. 8 is a plan view of the actuating handle shown in FIG. 7; and,

FIG. 9 is an elevational view of a pin forming part of the handle assembly embodying the present invention.

DETAILED DESCRIPTION OF THE PREFERRED EMBODIMENT

Figure 1:
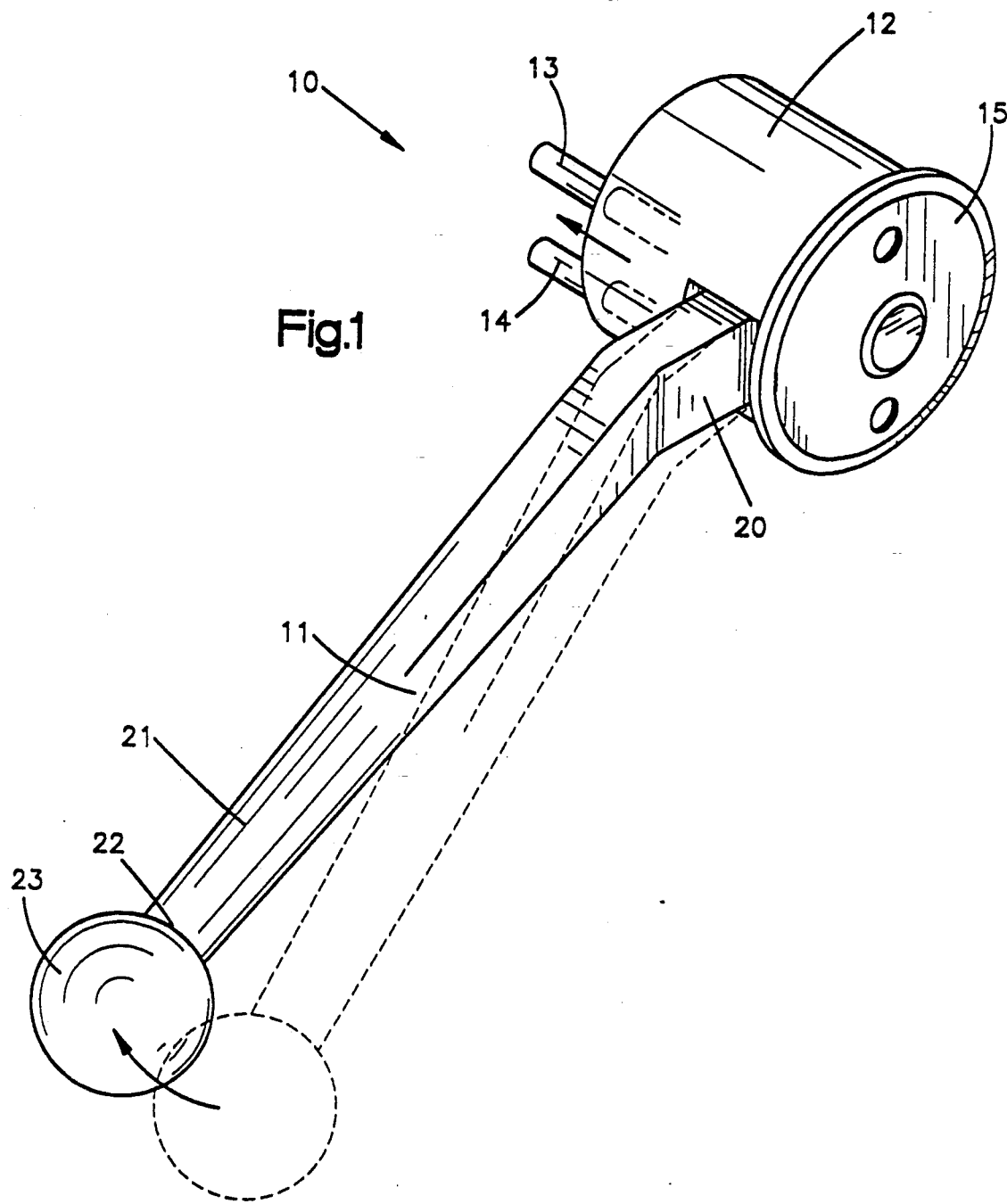
FIG. 1 is a perspective view of a handle assembly embodying the present invention.

FIG. 1 illustrates a quill-feed speed handle assembly 10 for use with a milling machine to produce rotational movement in a machine element. The handle assembly 10 comprises a handle member 11, a member engagement housing 12, two pins 13, 14, and a cover 15.

As best seen in FIGS. 1, 7 and 8, the handle member 11 comprises an engagement portion 20 and a lever portion 21 connected to the handle engagement portion 20. The lever portion 21 is bent at an angle relative to the engagement portion 20 and thereby forms an obtuse angle relative to the engagement portion.

A distal end 22 of the handle member 11 has a plurality of threads. This allows for a ball 23 to be screwed onto the distal end 22. The ball 23 aids an operator when gripping and using the handle assembly 10.

The engagement portion 20 defines a through-bore 24. Additionally, the engagement portion defines a recess 25 within a top surface 26.

The member engagement housing 12 has a top face 27 and an engagement face 28. The housing 12 defines a central axial bore 29.

The member engagement housing 12 further defines a handle recess 30 for receiving the handle engagement portion 20 of the handle member 11. The handle recess 30 is transverse to the axial bore 29. A through-bore 31 is defined by the member engagement housing 12 and is transverse to and located above the handle recess 30. The handle member through-bore 24 and the housing through-bore 31 are aligned when the handle member 11 is properly mounted within the handle recess 30. A connector pin 32 is placed within the through-bores 24, 31 in order to pivotally connect the handle member 11 to the member engagement housing 12.

Figure 2:
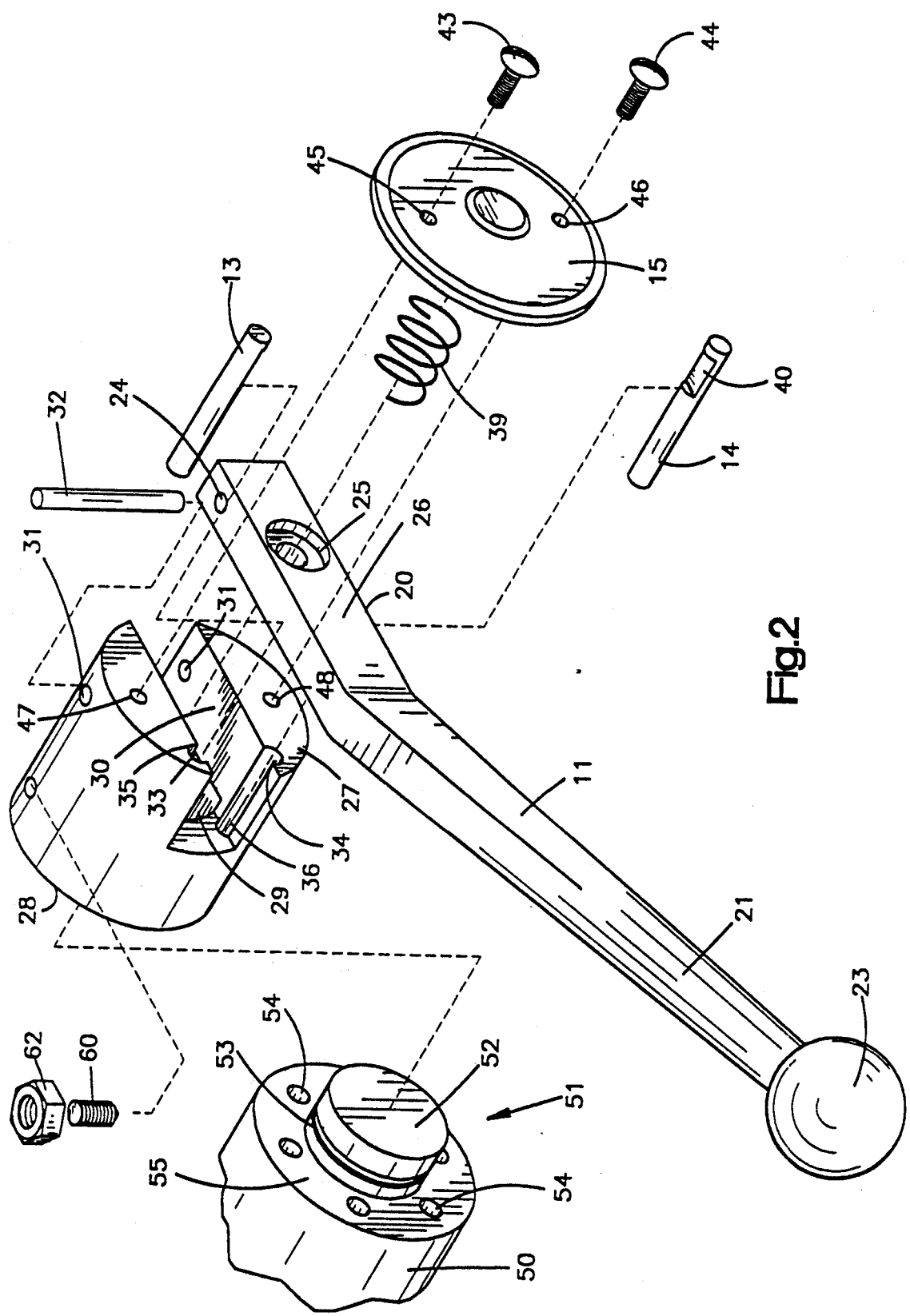
FIG. 2 is an exploded view of a handle assembly embodying the present invention.
Figure 3:
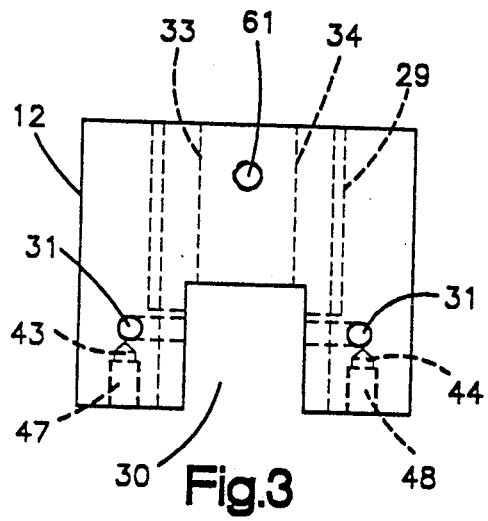
FIG. 3 is an elevational view of a member engagement housing forming part of the handle assembly embodying the present invention.

Two pin bores 33, 34 are defined by the member engagement housing 12 and flank the handle recess 30. As best seen in FIG. 2, upper portions 35, 36 of the pin bores 33, 34 open into the handle recess 30.

Figure 5:
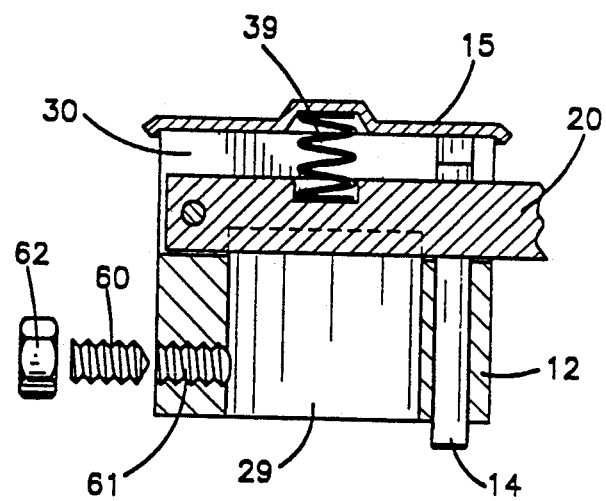
FIG. 5 is a fragmentary, sectional view of the handle assembly as seen approximately from the plane indicated by the line 5—5 in FIG. 4.
Figure 4:
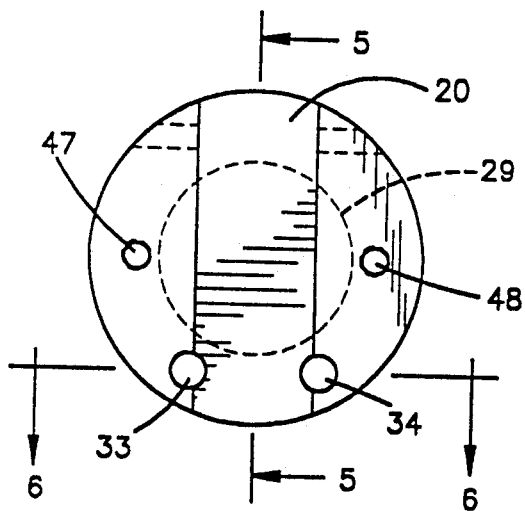
FIG. 4 is a plan view of a member engagement housing shown in FIG. 3.
Figure 6:
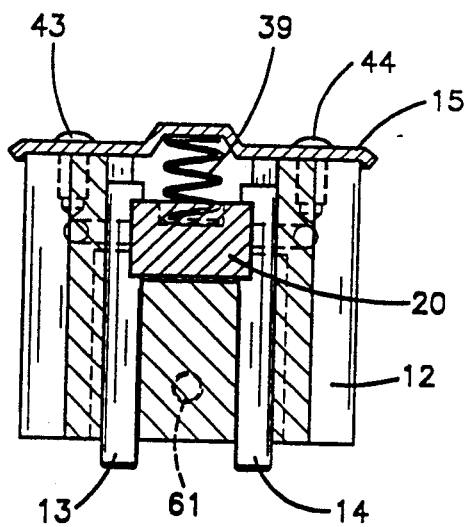
FIG. 6 is a sectional view of the handle assembly as seen approximately from the plane indicated by the line 6—6 in FIG. 4.

The pins 13, 14 each define a notch 40 as best seen in FIG. 9. As best seen in FIGS. 5 and 6, when the pins 13, 14 are mounted within the pin bores 33, 34 and the handle member 11 is mounted within the handle recess 30, the notches 40 engage opposite sides of a peripheral portion of the engagement portion 20 of the handle member.

When the handle assembly 10 is assembled, a spring 39 is placed within the recess 25 of the handle member 11 and the cover 15 is placed over the top face 27 of the member engagement housing 12. The cover is secured to the top surface with screws 43, 44 that are screwed into cover bores 45, 46 and on into housing bores 47, 48.

As shown in FIG. 1, the handle member is capable of movement between an engagement position and a non-engagement position (shown in phantom). The spring 39 biases the handle member 11 into the engagement position.

Once the handle assembly 10 is assembled, it is mounted to a quill shaft member 50 to produce movement in a quill (not shown) and an associated tool (not shown). The quill shaft member 50 has an engagement region 51 comprising a collar-like structure 52. The collar-like structure 52 is round and defines a groove 53 that extends about the entire circumference of the collar-like structure. The engagement region 51 further comprises a plurality of bores 54 defined within an engagement surface 55 of the quill shaft member 50.

When the handle assembly 10 is mounted to the quill shaft member 50, the collar-like structure 52 is placed within the axial bore 29 defined within the member engagement housing 12. The axial bore 29 is sized to fit over the collar-like structure 52 while allowing the member engagement housing 12 to rotate smoothly relative to the quill shaft member 50. The engagement face 28 engages the engagement surface 55.

In order to connect the member engagement housing 12 to the collar-like structure 52, a threaded member 60 is placed through a threaded bore 61 defined within the member engagement housing 12. The threaded member 60 engages the groove 53 of the collar-like structure 52 and is maintained in this connecting relationship with a nut 62. The threaded member 60 loosely engages the groove 53 and thereby allows the handle assembly 10 to rotate relative to the quill shaft member 50 while preventing their separation.

In order to prevent the rotation of the handle assembly 10 relative to the quill shaft member 50, the pins 13, 14 are placed within a selected two of the bores 54. As best seen in FIGS. 1, 5 and 6, the pins 13, 14 normally extend out of the pin bores 33, 34 beyond the engagement face 28 when the handle member 11 is in the engagement position and are therefore capable of engaging the two selected bores. By moving the handle member 11 into the non-engagement position, the pins are withdrawn from the selected bores and are fully contained within the pin bores 33, 34. This allows the handle assembly 10 to rotate relative to the quill shaft member 50 and thereby allows the machine operator to reposition the handle member 11 into a more desirable position for operation of the machine.

As is readily apparent, the handle assembly 10, when the handle member is in the engagement position, can be quickly manipulated to move the quill and its associated tool into a position for work. The operator can then move the handle member 11 into the non-engagement position and reposition the handle member relative to the quill shaft member 50, and thereby the machine, to provide a better "grip" and better leverage for performing the work of the machine. Additionally, the two pins provide superior strength when applying force to the handle member 11 in order to operate the machine.

As is readily apparent in the drawings, the manufacture of the handle assembly 10 is relatively easy. As with prior handle assemblies, the various recesses and bores must be drilled within the member engagement housing. However, instead of drilling a single pin bore that must be aligned with a slot defined within the handle member 11, two pin bores are drilled along side the handle recess 30. Notches 40 are then created within the pins 13, 14, which then engage the handle member 11 when the handle assembly is assembled, thereby allowing the handle member 11 to move the two pins. As is evident, the level of precision during machining of the handle assembly 10 is thereby greatly reduced when compared to prior art handle assemblies.

Although the preferred embodiment of this invention has been shown and described, it should be understood that various modifications and rearrangements of the parts by may be resorted to without departing from the scope of the invention as disclosed and claimed herein.

I claim:

1. A handle for use with machines having a quill and a quill shaft such as milling machines, said handle comprising:
   a) a handle member;
   b) two pins for engaging selected bores defined by said quill shaft, each of said pins defining at least one notch for engaging a peripheral portion of said handle member;
   c) an engagement housing having an engagement face, and defining a handle recess for receiving said handle member and two pin bores for receiving said pins, said pin bores flanking said handle recess such that they are at least in part open-face bores that open into said handle recess;

d) means for coupling said engagement housing to said quill shaft such that said housing can rotate relative to said quill shaft;

e) means pivotally connecting said handle member to said engagement housing when said handle member is mounted within said handle recess, said pins being mounted within said pin bores such that said notches are oriented towards and engage opposite sides of said peripheral portion of said handle member when said handle member is so connected, said pins being reciprocally movable with said handle member when said handle member pivots such that when said handle member is in an engagement position, said pins extend through said pin bores beyond said engagement face and engage said selected bores thereby preventing rotation of said member housing relative to said quill shaft, and when said handle member is in a non-engagement position, said pins are retracted into said pin bores thereby allowing rotation of said engagement housing relative to said quill shaft; and f) means biasing said handle member towards said engagement position.

2. The handle of claim 1 further comprising a cover attached to said engagement housing, said handle member engaging said cover when said handle member is in said non-engagement position.

3. The handle of claim 2 wherein said biasing means comprises a spring mounted between said handle member and said cover.

4. A handle assembly for producing rotative motion in an operating member of a machine element, said machine element operating member including structure defining at least two spaced-apart, axially directed bores, said assembly comprising:

a) a member engagement housing including means for coupling said housing to said member in a confronting relationship while permitting relative rotation between said housing and said operating member;

b) an actuating handle pivotally mounted to said housing and movable between released and machine element operating positions;

c) at least two pins reciprocally mounted in said engagement housing and movable into and out of said spaced-apart bores of said operating member;

d) means operatively connecting said pins to said actuating handle such that movement in said handle between said released and operating positions produces attendant, concurrent motion in said pins into and out of said machine element operating member bores;

e) said means operatively connecting said pins comprising a notch defined by each pin engageable with a peripheral region of said handle; and, f) means biasing said pins towards said machine element operating position.

5. The handle assembly of claim 4 wherein said means for coupling comprises:

a) a groove defined by said operating member; and, b) a set screw carried in a bore defined by said member engagement housing and engaging said groove loosely thereby coupling said housing and said operating member to allow said housing to rotate relative to said member.

6. A handle assembly for producing rotational movement in a machine element having structure defining an engagement region having at least two engagement recesses, comprising:

a) structure engaging housing including at least two spaced apart bores positioned in confronting relation with said machine element structure when said housing is operatively connected to said machine element;

b) means coupling said housing to said structure, said coupling maintaining said confronting relationship between said housing and said engagement region of said structure while permitting relative rotation therebetween;

c) an actuating handle pivotally connected to said housing and movable between structure engaging and structure releasing positions;

d) a pair of pins slidably supported in said housing bores;

e) each of said pins defining a notch near an inner end, said notch sized to receive a peripheral portion of said actuating handle such that movement in said handle between said structure releasing and structure engaging positions produces concurrent movement in said pins, said pins being aligned with said recesses and moving into said recesses when said actuating handle moves to said structure engaging position; and, f) means biasing said pins toward said structure engaging position.

7. The handle assembly of claim 6 wherein said engagement region comprises a collar-like structure and said engagement recesses are a plurality of spaced apart axial bores defined within said collar-like structure and arranged in a circle, said pins engaging two selected bores when said actuating handle moves into said engaging position.

8. The handle assembly of claim 7 wherein said structure comprises a quill shaft and said machine element comprises a quill, both of which are used in machines such as milling machines or drill presses.

* * * * *